United States Patent [19]

Cerny

[11] Patent Number: 4,584,154
[45] Date of Patent: Apr. 22, 1986

[54] CROSSHEAD WITH LONGITUDINAL AND TRANSVERSE SHEAR MIXERS

[75] Inventor: Daryl D. Cerny, Greenville, Ohio
[73] Assignee: Ball Corporation, Muncie, Ind.
[21] Appl. No.: 707,348
[22] Filed: Mar. 1, 1985
[51] Int. Cl.[4] .......................... B29D 23/04; B29F 3/04; B01F 7/10
[52] U.S. Cl. ................................. 264/209.2; 425/206; 425/207; 425/381; 425/224; 425/466
[58] Field of Search ............... 425/113, 206, 207, 224, 425/380, 381, 466, 376 B; 264/209.1, 209.2; 366/99

[56] References Cited

U.S. PATENT DOCUMENTS

| | | | |
|---|---|---|---|
| 2,607,077 | 8/1952 | Dulmoge | 425/207 X |
| 2,669,750 | 2/1954 | Keeney | 425/207 X |
| 3,153,686 | 10/1964 | Adams | 425/207 X |
| 3,355,769 | 12/1967 | Fogelberg | 264/209.1 X |
| 3,694,123 | 9/1972 | Cook et al. | 425/376 B X |
| 4,173,446 | 11/1979 | Larsen | 425/380 |
| 4,280,801 | 7/1981 | Wheeler et al. | 425/113 |
| 4,389,119 | 6/1983 | Valsamis et al. | 425/466 X |
| 4,411,532 | 10/1983 | Valsamis et al. | 425/466 X |
| 4,486,099 | 12/1984 | Tadmor | 425/466 X |
| 4,541,793 | 9/1985 | Lindqvist | 425/466 X |

Primary Examiner—J. Howard Flint, Jr.
Attorney, Agent, or Firm—Gilbert E. Alberding

[57] ABSTRACT

A crosshead (10b) and a method are provided for extruding a tubular layer of a thermoplastic material, or for coextruding tubular layers of various thermoplastic materials, without incurring a weld line. The crosshead (10b) includes a supply passage (46) which provides an annular flow of thermoplastic material around a mandrel (18b) by providing separate flows that merge distal from a supply passage (52), a first compressive forging passage (72) that provides static mixing by transverse viscous shear, a longitudinal shear mixer (44a) that provides static mixing by longitudinal viscous shear, and a second compressive forging passage (94) that provides static mixing by longitudinal shear, and an extrusion opening (110).

49 Claims, 5 Drawing Figures

CROSSHEAD WITH LONGITUDINAL AND TRANSVERSE SHEAR MIXERS

BACKGROUND OF THE INVENTION

1. Field of the Invention

The present invention relates generally to crossheads for extrusion of thermoplastic materials. More particularly, the present invention relates to a crosshead having static mixers for eliminating the weld line that occurs when some types of thermoplastic materials are fed transversely around both sides of a mandrel from a supply port, and then are extruded through the die opening.

2. Description of the Prior Art

In the extrusion of thermoplastic materials through a crosshead, it is common practice to pump the molten thermoplastic material into a supply passage and to force the molten thermoplastic material out through a die opening. The die opening may be of any desired cross sectional shape.

When a tubular layer of thermoplastic material is to be molded, it is necessary to provide a core or a mandrel inside the die opening. When this tubular layer of thermoplastic material is electrical insulation on a wire, then the wire, or the wire plus a previously extruded layer of thermoplastic material, is the core.

When a thermoplastic tubing is to be extruded, then a steel mandrel determines the inside diameter of the layer of thermoplastic material; or, in the case of coextruded tubing having a plurality of layers, the outside surface of an inner and previously extruded tubular layer of thermoplastic material is the core.

Further, it is common practice to extrude a thermoplastic material into a tubular shape, and then to process the tubing into bottles, or other containers, by pinching off a portion of the tubing, by placing the portion of tubing into a mold, and then by blowing the tubing into the shape of the mold.

Since the molten thermoplastic material must be supplied through a supply passage that opens on one side of the core or mandrel, the flow of thermoplastic material must flow transversely inward and then around the core or mandrel to form an annular flow of material that can be extruded longitudinally.

It is common practice to divide the flow of thermoplastic material into two streams that each flow half way around the longitudinal axis of the crosshead, and that join distal from the supply passage.

Some types of thermoplastic materials tend to develop a weld line where the separate branches of thermoplastic material join. This weld line exists in the annular and longitudinal flow of the thermoplastic material, in the finished tubing, and in a blown container made from the tubing.

Weld lines are detrimental for two reasons. One is that weld lines weaken the tubing, and so the tubing may burst at the weld line while being blown into a container. The other reason is that, when containers are blown from a transparent thermoplastic material, weld lines are unsightly in what otherwise would be a clear and glass-like container.

Therefore, it is important to be able to produce extruded tubing that does not include weld lines without regard to the type of thermoplastic being extruded.

The problem of weld lines in tubing extruded from thermoplastic materials is even more critical for tubing that is to be used for fabricating containers for certain uses; because, for these particular uses, a homogeneous tubing of a single thermoplastic material is not the most desirable.

For instance, in the food processing industry, where the preservation of taste and the prevention of deterioration through contact with air is essential, and where the cost of the containers is quite competitive, it is economically imperative that bottles, jars, and tub-shaped containers be made with layers of various thermoplastic materials that differ in physical characteristics and cost.

Thus a container for the food processing industry may have a layer of thermoplastic material for the inside of the container that will not impart a foreign taste to the food product and that will conserve freshness by excluding air, a similar layer of thermoplastic material for the outside of the container, and an inner layer of a more economical thermoplastic material.

These multilayered plastic containers are blown from tubing that consists of several and sometimes as many as six, or more, layers of thermoplastic material.

Often, the containers are made of thermoplastics that are transparent; uniform transparency is important to the food processor; and a weld line in any of the layers of thermoplastic in the extruded tubing results in a blemish that is detrimental to the appearance of the finished containers.

Some types of thermoplastic materials, such as polypropylene, polyvinyl chloride, and polycarbonate, are difficult to extrude without a weld line. Thus, it is extremely important to have a crosshead that will extrude multilayered tubing of various types of thermoplastic materials without forming a weld line in any of the layers.

While mixing by dividing and reuniting may be used with some materials that are difficult to extrude without a weld line, such as polypropylene, such mixing methods are not suitable for polycarbonate, and certain other of the structural thermoplastic materials; because these types of thermoplastic materials are shear sensitive. That is, the more a flow of polycarbonate is cut into a plurality of streams, the more difficult it is to reunite the separate streams of thermoplastic material.

Further, polycarbonate is sensitive to being held at extruding temperatures; and, if kept at extruding temperatures for too long a time, polycarbonate degrades, and develops carbon inclusions. Therefore, the method of static mixing that is used to eliminate weld lines must provide a flow path in which the flow time through the crosshead is not excessive, and in which there are no areas of stagnant flow.

It is important to eliminate stagnant flow areas for two reasons. One reason is to prevent some of the polycarbonate from remaining stagnant in certain areas of the crosshead and thereby degrading during the extruding process.

The other reason is that none of the polycarbonate must remain in the crosshead after the completion of extrusion, or the heat of the crosshead will cause the remaining polycarbonate to degrade.

Thus, a crosshead for extruding polycarbonate, or other thermoplastic materials that have the propensity to degrade at extruding temperatures, should not have stagnant flow areas in order that another thermoplastic material, that is not so sensitive to extruding temperatures, may be used at the end of an extrusion run, to clean out all remaining polycarbonate from the crosshead. Otherwise it will be necessary to disassemble the crosshead and mechanically remove the remaining polycarbonate.

In U.S. Pat. No. 3,355,769, Folgelberg disclosed a crosshead in which the flow of plastic material entered tangentially around the mandrel to prevent the weld line.

However, since some thermoplastic materials, such as polyvinyl chloride, and more particularly, polycarbonate, degrade as a function of time and temperature, it is important that the molten thermoplastic material proceed through the crosshead in a minimum time, with a uniform velocity, and without stagnant areas.

In contrast to these flow requirements, which dictate distribution passage size and shape, the distribution passage of Folgelberg is relatively large. Also, his distribution passage is uniform in cross section; so that the velocity of the molten plastic would be much too slow at a point diametrically opposite of the supply passage.

Wheeler, Jr., et al., in U.S. Pat. No. 4,280,801, show and describe the supplying of molten thermoplastic material to the die by means of a supply passage, a first distribution branch that is connected to the supply passage and that partially encircles the longitudinal axis in a first direction, and a second distribution branch that is connected to the supply passage and that partially encircles the longitudinal axis in the other direction and that joins, or abuts, the first branch diametrically distal from the supply passage.

The first and second distribution branches of Wheeler, Jr., et al. are proportioned in cross sectional area, being a maximum at the supply passage and reducing to a minimum where the branches join distal from the supply passage.

By this progressive reduction in cross sectional area in the flow paths, stagnation in the flow of the molten plastic has been substantially eliminated, a reduction in the time that any of the molten plastic is in the crosshead has been achieved, and a reduction in heat-caused degradation of the thermoplastic material has been achieved.

However, even though Wheeler, Jr., et al. achieved their objective of eliminating stagnant areas in the flow path, a weakness of crossheads that utilize their type of feed passages is that there is the tendency to develop weld lines in the extruded thermoplastic tubing. These weld lines occur at a circumferential location on the extruded tubing that corresponds to the point where the separate distribution branches join distal from the supply passage.

It is believed that the weld line is caused by a film of degraded material on the surface of the two branches of molten thermoplastic that meet distal from the supply passage; and so mixing of these two flows, to disperse the degraded film, should eliminate the weld line.

The prior art teaches the use of static mixing in the extrusion of thermoplastics. In U.S. Pat. No. 2,669,750, Keeney taught the use of static mixing to assure uniform color in extruded materials in which a dye is mixed with the powder of a thermoplastic.

Further, the prior art teaches the use of static mixing to eliminate weld lines in extruded tubing. Larsen, in U.S. Pat. No. 4,173,446, teaches the use of static mixing to eliminate weld lines where several radial branches of thermoplastic are fed to the extrusion die for large diameter tubing.

However, the prior art has not taught apparatus or methods that eliminate weld lines to the extent that is needed for the production of tubing from polycarbonate and some of the other structural thermoplastic materials.

In contrast, the present invention provides apparatus and method for completely eliminating weld lines in these types of thermoplastic materials.

SUMMARY OF THE INVENTION

In the present invention, a crosshead includes a supply passage for receiving a molten thermoplastic material transversely of a longitudinal axis of the crosshead.

A distribution passage is provided which includes first and second distribution branches, both of which communicate with the supply passage. The first distribution branch partially encircles the longitudinal axis in a first direction. The second distribution branch partially encircles the longitudinal axis in the other direction and substantially abuts the first distribution branch distal from the supply passage. The first and second distribution branches cooperate to provide an annular flow of thermoplastic material around the longitudinal axis of the crosshead that has a first cross sectional area.

An annular die opening is provided that comprises the annular space between a die that is disposed around the longitudinal axis and a core or mandrel die that is disposed in the crosshead.

A first compressive forging passage is interposed intermediate of the distribution passage and the die opening. The first compressive forging passage compressively forges the thermoplastic material into a second cross sectional area that is larger than the first cross sectional area of the distribution passage, thereby providing mixing by transverse shear in the thermoplastic material.

A longitudinal shear mixer is interposed intermediate of the first compressive forging passage and the die opening, decreases the area of the flow path into a third cross sectional area, and increases the ratio of wetted perimeter to the third cross sectional area of the flow path from that of the first compressive forging passage, thereby providing mixing by longitudinal shear in the thermoplastic material.

A second compressive forging passage is interposed intermediate of the longitudinal shear mixer and the die opening, and provides static mixing by compressively forging the thermoplastic material into a fourth cross sectional area that is larger than the third cross sectional area, and that has a lower ratio of wetted perimeter to cross sectional area than that of the longitudinal shear mixer, thereby providing static mixing by transverse shear in the thermoplastic material.

Preferably, a second longitudinal shear mixer is interposed intermediate of the second compressive forging passage and the die opening, and a third compressive forging passage is interposed intermediate of the second longitudinal shear mixer and the die opening.

Preferably, each of the longitudinal shear mixers includes a longitudinally disposed bore that is cylindrical in shape, a longitudinally disposed mixing mandrel that is cylindrical in shape and that is disposed in the bore; and each of the longitudinal shear mixers includes a plurality of longitudinally disposed mixing passages that are spaced circumferentially around the longitudinal axis of the crosshead.

Preferably, each of the longitudinal mixing passages in both of the longitudinal shear mixers decreases in cross sectional area, and each increases in their ratio of wetted perimeter to cross sectional area from respective inlets thereof to respective outlets thereof.

In a preferred embodiment, the longitudinally disposed mixing passages in the first longitudinal shear mixer are helically shaped and wrap around the longitudinal axis in one direction; and the longitudinally disposed mixing passages in the second longitudinal shear mixer are helically shaped and wrap around the longitudinal axis in the other direction.

Thus, the present invention utilizes at least two types of static mixers to eliminate the weld line.

In the first of these two types of static mixers, a compressive forging passage is used to compressively forge the annular flow of thermoplastic material into an increased cross sectional area; and so the thermoplastic material is mixed by transverse shear.

In the other of these types of static mixers, the ratio of wetted area to cross sectional area of the annular flow of thermoplastic material is increased; so that the flow of thermoplastic material is mixed by increasing the longitudinal shear therein.

In a preferred embodiment, the present invention utilizes a third type of static mixers; and this third type of static mixing comprises a change in direction of flow as the thermoplastic material enters the first helically shaped mixing passages; and also to a greater extent, by the change of direction of flow as the thermoplastic material leaves a plurality of helically shaped mixing passages that wrap around the longitudinal axis in a one direction and enters a plurality of helically shaped mixing passages that wrap around the longitudinal disposed axis in the other direction.

In the preferred configuration, the outlets of the first helically shaped mixing passages are rotationally aligned with the inlets of the second helically shaped mixing passages. However, this alignment has been done for convenience of fabricating the mandrel; and, if more mixing by change of direction is desired, or if the mixing by change of direction is desired without resorting to the helical shape of the longitudinally disposed mixing passages, the inlets of the second longitudinally disposed mixing passages may be rotationally displaced from the outlets of the first longitudinally disposed mixing passages.

The crosshead may include a plurality of die openings for extrusion of multilayered thermoplastic tubing. If so, the crosshead will include a supply passage and a distribution passage for each die opening.

Further, for each die opening that is intended for use with a thermoplastic material that has the propensity to form weld lines, the crosshead will include at least one, and possibly a plurality of at least two of the types of static mixers as discussed above.

BEST MODE FOR CARRYING OUT THE INVENTION

Figure 1:
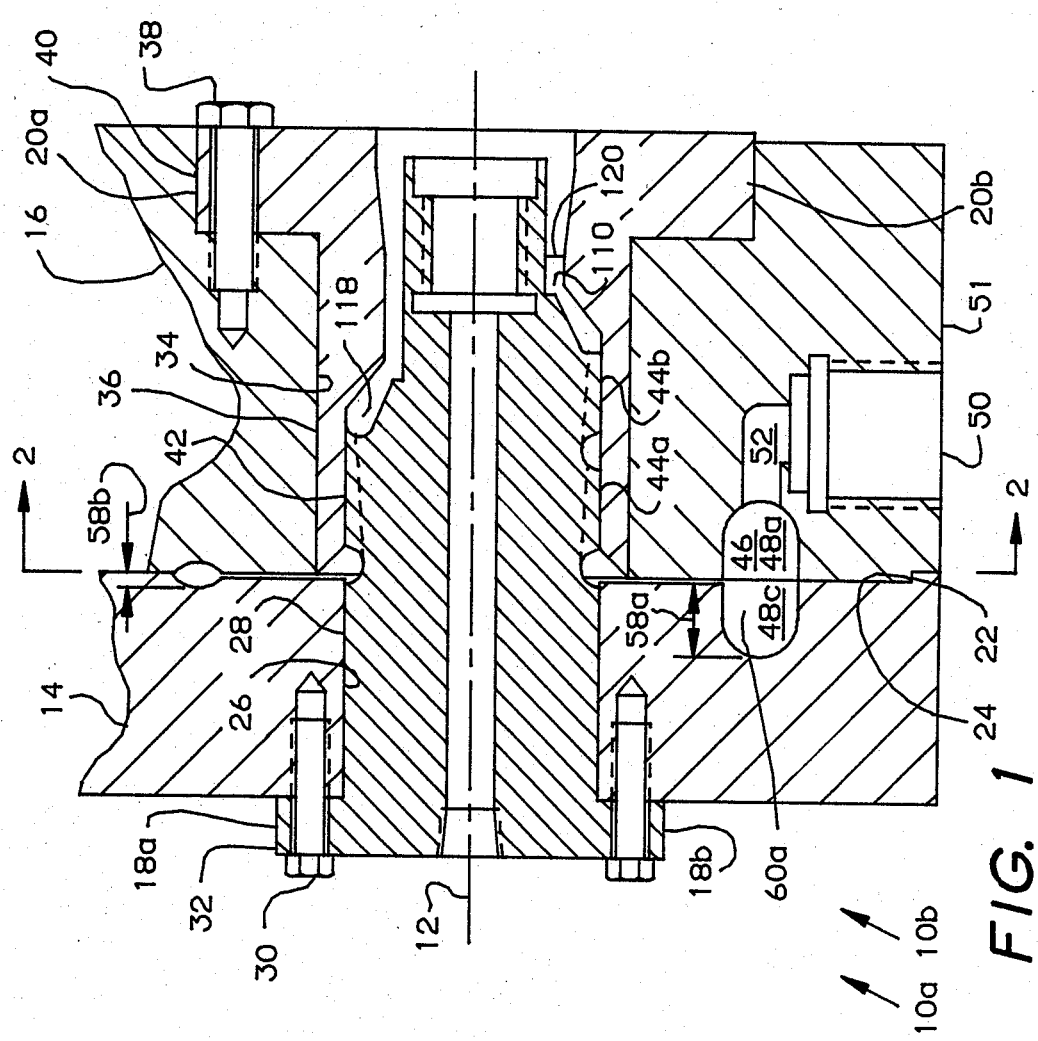
FIG. 1 is a composite cross sectional elevation of the two embodiments of the crosshead of the present invention, showing one embodiment in which the mandrel includes one longitudinal shear mixer, and showing another embodiment in which the mandrel includes two longitudinal shear mixers.

Referring now to the drawings, and more particularly to FIG. 1, a crosshead 10a includes the following parts, all of which are circumferentially disposed around a longitudinal axis 12: a first plate, or end plate, 14 that is cylindrically shaped, a second plate, or body plate, 16 that is cylindrically shaped, a mandrel 18a, and an adapter 20a.

Also shown in FIG. 1, is a crosshead 10b that includes the same parts as the crosshead 10a; except that the crosshead 10b includes a mandrel 18b and an adapter 20b.

Thus, the drawing of FIG. 1 shows two preferred embodiments of the present invention, one of which is shown above the longitudinal axis 12, and the other of which is shown below the longitudinal axis 12.

The plates 14 and 16 are radially aligned by a pilot 22 of the body plate 16 that engages a pilot bore 24 of the end plate 14. Both the pilot 22 and the pilot bore 24 are concentric with the longitudinal axis 12.

The end plate 14 includes a bore 26; the mandrel, 18a or 18b, includes a cylindrical portion 28 that guidingly engages the bore 26; and the mandrel, 18a or 18b, is attached to the end plate 14 by bolts 30 that extend through a flange 32 of the mandrel, 18a or 18b, and that screw into the end plate 14.

The body plate 16 includes a bore 34; the adapter, 20a or 20b, includes a cylindrical portion 36; and the adapter, 20a or 20b, is attached to the body plate 16 by bolts 38 that extend through a flange 40 of the adapter, 20a or 20b, and that screw into the body plate 16.

The mandrel 18a of the crosshead 10a includes a single longitudinal shear mixer 42; the mandrel 18b includes a first longitudinal shear mixer 44a and a second longitudinal shear mixer 44b; the adapter 20a is designed to cooperate with a mandrel, 18a, having only one longitudinal shear mixer, 42; and the adapter 20b is designed to cooperate with a mandrel, 18b, having two longitudinal shear mixers, 44a and 44b.

Figure 2:
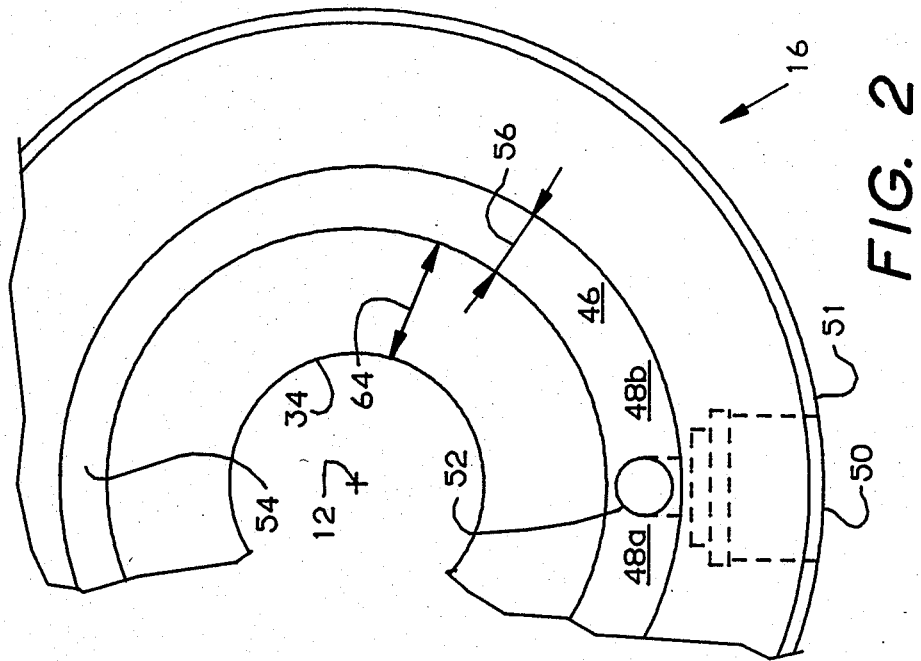
FIG. 2 is a partial end view of FIG. 1, taken substantially as shown by view line 2—2 of FIG. 1, and showing the body plate with the distribution branches thereof.

Referring now to FIGS. 1 and 2, the crossheads, 10a and 10b, each include a distribution passage 46. The distribution passage 46 includes four distribution cavities. Two of these distribution cavities, 48a and 48b are disposed in the body plate 16, and are shown in FIG. 2. The other two of the distribution cavities are disposed in the end plate 14; and one of these, distribution cavity 48c, is shown in cross section in FIG. 1.

The distribution cavity 48a is a left-hand variation of the distribution cavity 48b; and the other two distribution cavities, 48c and one distribution cavity of the end plate 14 which is not shown, are a mirror image of the distribution cavities 48a and 48b. Therefore, a description of the distribution cavity 48b will suffice for all four.

The body plate 16 includes supply port 50 that extends inward from an outer surface 51 of the body plate 16 and that is disposed orthogonal to the longitudinal axis 12. A supply passage 53 communicates with the supply port 50, extends radially inward, turns, and extends longitudinally toward the end plate 14.

The distribution cavity 48b communicates with the supply passage 52, is disposed radially outward from the longitudinal axis 12, extends circumferentially a part of the way around the longitudinal axis 12 from the supply passage 52 in a first direction and terminates at a point 54 that is diametrically distal from the supply passage 52.

A radial width 56 of the distribution cavity 48b progressively decreases from the supply passage 52 to the point 54 as can be seen in FIG. 2; and the depth of the distribution cavity 48a progressively decreases from the supply passage 52 to the point 54 as indicated by the decrease in the depth 58a of the distribution cavity 48a to a depth 58b, as seen in FIG. 1.

Therefore the cross sectional area of a distribution cavity, 48a or 48b, progressively decreases from the supply passage 52 to the point 54.

Two of the distribution cavities, 48a and 48c, cooperate to provide a first distribution branch 60a; and the other two distribution cavities, 48b and a fourth distribution cavity that is not shown, cooperate to provide another distribution branch, not shown.

Thus, the distribution branch 60a communicates with the supply passage 52, is disposed radially outward from the longitudinal axis 12, extends circumferentially a part of the way around the longitudinal axis 12 in one direction, progressively decreases in cross sectional area from a maximum proximal to the supply passage 52 to a minimum which it terminates at the point 54 distal from the supply passage 52.

In like manner, the other distribution branch, not shown nor numbered, includes the distribution cavity 48c of the end plate 14, communicates with the supply passage 52, is disposed radially outward from the longitudinal axis 12, extends circumferentially a part of the way around the longitudinal axis 12 in the other direction, progressively decreases in cross sectional area from a maximum proximal to the supply passage 52 to a minimum where it terminates at the point 54 diametrically distal from the supply passage 52, and cooperates with the distribution branch 60a to provide an annular flow of thermoplastic material around the longitudinal axis 12.

Figure 3:
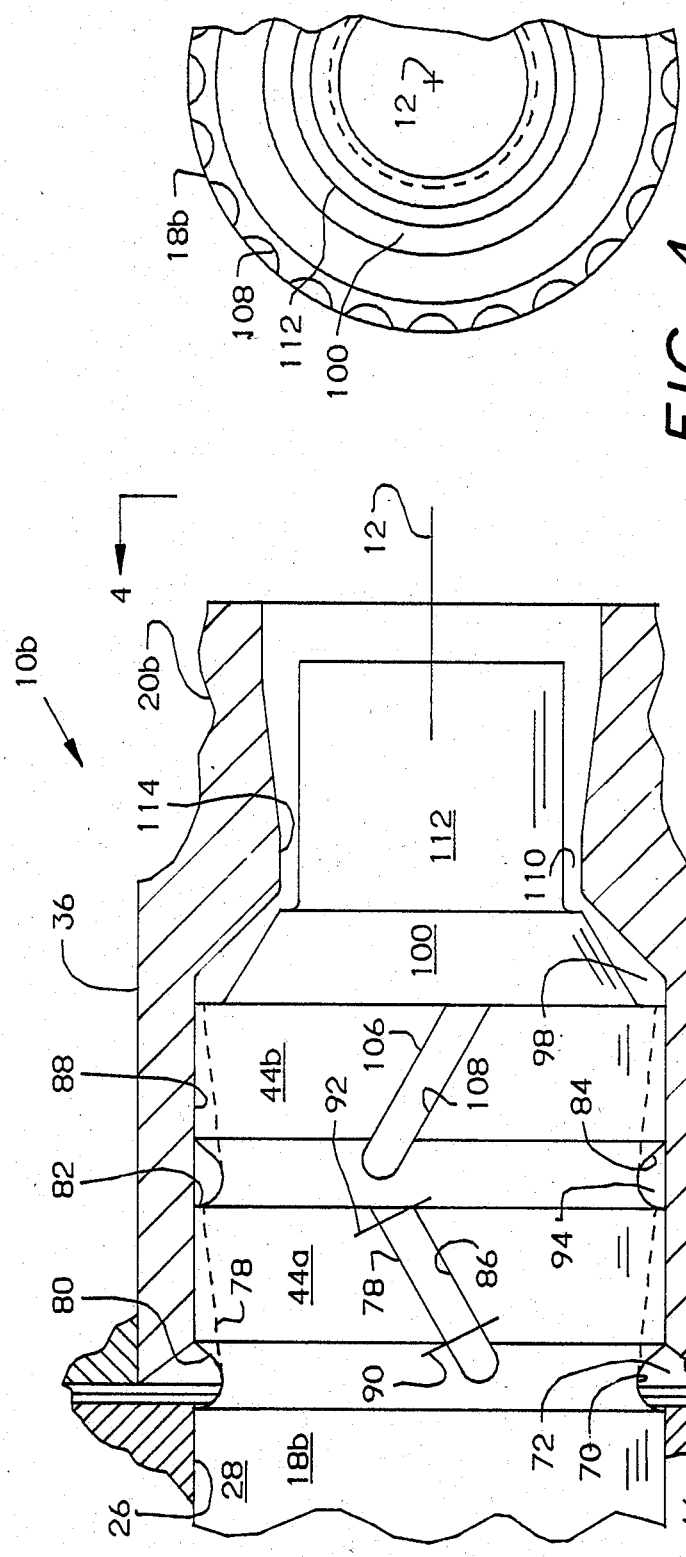
FIG. 3 is a partial and enlarged cross section of one of the embodiments of FIG. 1, taken substantially the same as FIG. 1, showing representative ones of the plurality of helically shaped mixing passages that wrap around the mandrel in a first direction in the first longitudinal shear mixer, and showing representative ones of the plurality of helically shaped mixing passages that wrap around the mandrel in the other direction in the second longitudinal shear mixer.

Referring now to FIGS. 1-3, and more particularly to FIGS. 2 and 3, the crossheads, 10a and 10b, include a choke passage 62 which extends radially inward from the distribution passage 46, which has a radial land width 64 that decreases from a maximum at the supply passage 52 to a minimum at the point 54, and which has a first cross sectional area at an inner annulus 66.

The choke passage 62 cooperates with the distribution passage 46 to provide distribution passage means; so the cross sectional area of the inner annulus 66 is the first cross sectional area of the flow of thermoplastic material that is provided by the distribution passage means.

Figure 5:
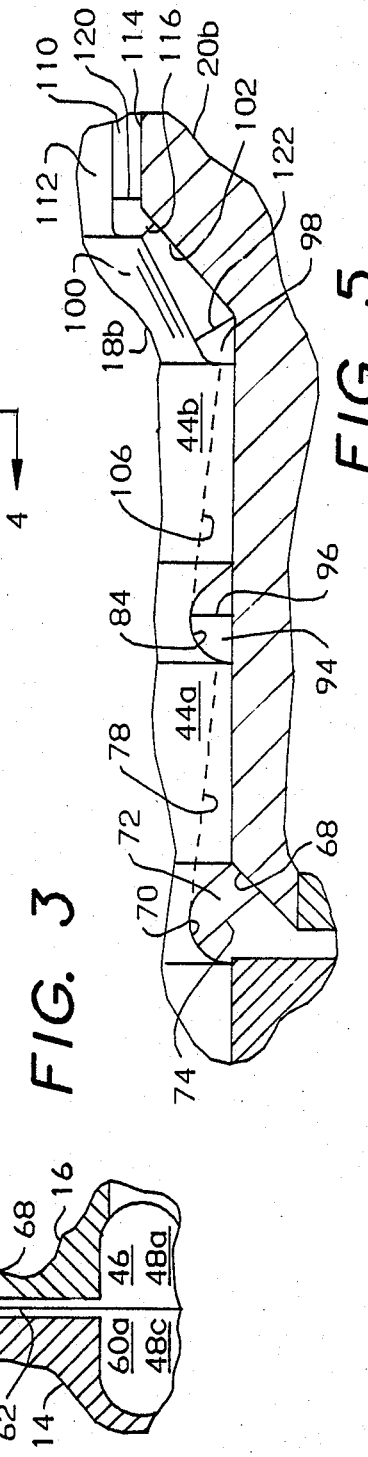
FIG. 5 is a partial and further enlarged cross section of the crosshead of FIG. 3, taken substantially the same as FIG. 3, and enlarging some of the features of the static mixers greater than the enlargement of FIG. 3.

Referring now to FIGS. 3 and 5, the adapter 20b includes a circumferential chamfer 68; the mandrel 18b includes a first circumferential groove 70 that is juxtaposed to the cylindrical portion 28; and the chamfer 68 and the first circumferential groove 70 cooperate to form a first compressive forging passage 72.

The first compressive forging passage 72 includes a maximum cross sectional area, or second cross sectional area as defined by a line 74.

The crosshead 10b includes a first longitudinal shear mixer 44a. The first longitudinal shear mixer 44a includes a plurality of longitudinally disposed mixing passages, or helically shaped mixing passages 78.

Figure 4:
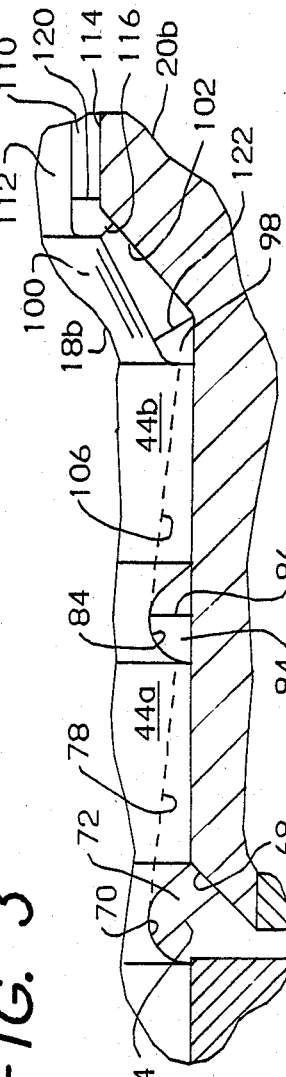
FIG. 4 is an end view of the mandrel of the crosshead of FIG. 3, taken substantially as shown by view line 4—4.

For clarity, two of the mixing passages 78 are shown in profile in FIG. 3, and one is shown in plan view in FIG. 3, even though a plurality of circumferentially spaced mixing passages 78 are cut into the mandrel 18b as shown in FIG. 4.

Each of the longitudinally disposed mixing passages 78 includes an inlet 80 that communicates with the first circumferential groove 70 and an outlet 82 that communicates with a second circumferential groove 84 of the mandrel 18b.

Each of the longitudinally disposed mixing passages 78 is defined by a helical groove 86 of the mandrel 18b and by a portion of a cylindrical bore 88 of the adapter 20b; and each of the helical grooves 86 wraps around the longitudinal axis in a first direction.

The inlet cross sectional areas of each of the longitudinally disposed mixing passages 78 is defined by a line 90 that is disposed orthogonal to the direction of flow of the thermoplastic material in the mixing passages 78; and the outlet cross sectional areas of each of the mixing passages 78 is defined by a line 92 that is disposed orthogonal to the direction of flow of the thermoplastic material in the mixing passages 78.

Each of the helical grooves 86 decrease in depth and in width, as can be seen in FIG. 5; so the cross sectional areas, as defined by the lines 90 and 92, of each of the mixing passages 78 decreases from a maximum at the inlet 80 thereof, to a minimum at the outlet 82 thereof.

The combined area of all of the outlet cross sectional areas 80, of the mixing passages 78, provides a total inlet area of the first longitudinal shear mixer 44a; and the combined area of all of the outlet cross sectional areas 82, of the mixing passages 78, provides a total outlet area of the first longitudinal shear mixer 44a.

The second circumferential groove 84 cooperates with a portion of the cylindrical bore 88 to provide a second compressive forging passage 94; and the second compressive forging passage 94 has a maximum cross sectional area, or third cross sectional area, that is defined by a line 96.

The crosshead includes a third compressive forging passage 98 that is formed by the circumferential space between an external cone 100 of the mandrel 18b and an internal cone 102 of the adapter 20b.

A second longitudinal shear mixer 44b is interposed intermediate of the second compressive forging passage 94 and the third compressive forging passage 98; and the second longitudinal shear mixer 44b includes a plurality of second longitudinally disposed mixing passages, or second helically disposed mixing passages, 106 which are formed by a plurality of second helical grooves 108 and a cooperating portion of the bore 88.

The second longitudinal shear mixer 44b is identical to the first longitudinal shear mixer 44a except that the plurality of second helical grooves 108 wrap around the longitudinal axis 12 in the opposite direction from that of the first helical grooves 86; and so all that has been described for the first longitudinal shear mixer 44a also pertains to the second longitudinal shear mixer 44b.

The crosshead 10b includes an extrusion opening 110 that consists of the annular space between a core portion 112 of the mandrel 18b and a die opening 114 of the adapter 20b; and the cones 100 and 102 converge to provide a pre-extrusion opening that is defined by a line 116, and that pre-extrudes the thermoplastic material prior to being extruded through the extrusion opening 110.

Referring now to FIGS. 1-5, in operation, molten thermoplastic material is pumped into the supply port 50, progresses through the supply passage 52, is distributed around the longitudinal axis 12 by the distribution passage 46, has a first cross sectional area at the inner annulus 66 of the choke passage 62, and is delivered to the first compressive forging passage 72.

In the first compressive forging passage 72, the flow of thermoplastic material is compressively forged into a second cross sectional area which is a maximum at the line 74, and which is larger than the first cross sectional area of the inner annulus 66 of the choke passage 62. Therefore, the thermoplastic material is mixed by transverse shear in the first compressive forging passage 72.

The thermoplastic material exiting from the first compressive forging passage 72 enters the first longitudinal shear mixer 44a by entering the inlets 80 of the longitudinally disposed mixing passages 78.

In the first longitudinal shear mixer 44a the thermoplastic material is mixed by longitudinal viscous shear. The longitudinal viscous shear is increased to the desired level by an increase in the ratio of wetted boundary to cross sectional area from the ratio of wetted boundary to cross sectional area of the first compressive forging passage.

The thermoplastic material exiting from the outlets 82 of the longitudinally disposed mixing passages 78 is delivered to another compressive forging passage in which the thermoplastic material is mixed by the transverse viscous shear that results from forging the thermoplastic material into a larger cross sectional area.

If only one longitudinal shear mixer, such as the longitudinal shear mixer 42 of FIG. 1, is used, then the thermoplastic material enters into a final compressive forging passage such as the final compressive forging passage 118 of FIG. 1, or the third compressive forging passage 98 of FIG. 3, prior to being extruded through an extrusion opening having a fourth cross sectional area, such as the extrusion opening 110, of FIG. 3, which has a fourth cross sectional opening, as defined by a line 120.

However, if more than one longitudinal shear mixer is used, such as the second longitudinal shear mixer 44b, then the thermoplastic material is mixed by longitudinal viscous shear in the second longitudinal shear mixer 44b, and then mixed again by transverse viscous shear in a third compressive forging passage, such as the compressive forging passage 98 which has a maximum cross sectional area as indicated by a line 122.

It is not difficult to visualize the transverse shear mixing that occurs when the flow of molten thermoplastic material is compressively forged into a larger cross sectional area; and it is not difficult to visualize the longitudinal shear mixing that occurs when the cross sectional area of the flow of molten thermoplastic material is decreased.

However, it is not so apparent that longitudinal shear viscous mixing will occur whenever the ratio of wetted boundary to cross sectional area of the flow path is increased; but this fact should become apparent from the following discussion.

A basic fact with regard to the flow of viscous materials is that, at Reynold's Numbers of less than 2000, fluid flow is laminar. Since the molten thermoplastic material has a relatively high viscosity, and since the flow velocity is relatively low, the flow of molten thermoplastic material in a crosshead most definitely is laminar.

Further, for laminar fluid flow, the velocity profile of the flow is parabolic, being a maximum at the center, or farthest point from the wall of a conduit, and reducing as a function of the square of the distance from the center.

Thus, for equal velocities at the center of a conduit, the smaller the diameter of the conduit, the greater the decrease in velocity for a given increment of distance from the center toward the wall of the conduit.

So if a number of individual conduits replace a single larger conduit, and if the total area of the smaller conduits equals the area of the larger conduit, the longitudinal viscous shear in the smaller conduits will be greater, even though the maximum flow velocity, the average flow velocity, and the rate of flow are equal.

Or considering the relationship between wetted boundary and longitudinal viscous shear in another way, since the pressure drop in a conduit, at Reynold's Numbers wherein the flow is laminar flow, is caused by viscous shear and is directly proportional to viscous shear, the relationship between wetted boundary, and viscous shear can be understood by considering the Hagen-Poiseuille law for laminar flow in circular pipes.

This law of physics shows that, for equal maximum velocities at the center of a conduit or pipe, the pressure drop per unit length of pipe increases inversely as the square of the diameter of the pipe.

Thus, if sixteen mixing passages 78, each having a diameter one-fourth as large as the compressive forging passage 72, were used, these sixteen mixing passages 78 would have a combined cross sectional area equal to the cross sectional area of the compressive forging passage 72, and the rate of longitudinal viscous shear in the mixing passages 78 could be sixteen times as large as the rate of longitudinal shear in the compressive forging passage 72.

This increase in longitudinal viscous shear by a factor of sixteen would be accomplished without decreasing the cross sectional area; but the total wetted boundary of the sixteen longitudinal shear mixing passages 78 would be four times as large as the wetted boundary of the compressive forging passage 72.

Since the wetted boundary is increased and the cross sectional area is kept constant, then the ratio of wetted boundary to cross sectional area is increased. Thus, a primary principle of the longitudinal shear mixers, 44a and 44b, is that they increase the longitudinal viscous shear by increasing the ratio of wetted boundary to cross sectional area.

Preferably this increase in the ratio of wetted boundary to cross sectional area includes the use of a plurality of substantially separate passages, such as the longitudinally disposed mixing passages 78.

Preferably, the increase in the ratio of wetted boundary to cross sectional area, from the second cross sectional area 74 of the first compressive forging passage 72, occurs both at the inlets 80 of the longitudinally disposed mixing passages 78 and intermediate of the inlets 80 and the outlets 82 of the mixing passages 78.

Further, inspection of the Hagen-Poiseuille law also indicates that the pressure drop in a conduit, and thus the rate of viscous shear, increases as the fourth power of a decrease in diameter, if the flow rate remains constant.

Therefore, preferably, the first longitudinal shear mixer 44a has a shear-mixing cross sectional area that is less than the second cross sectional area of the first compressive forging passage 72, whether this reduction of cross sectional area occurs at the inlets 80 of the mixing passages 78, at the outlets 82 of the mixing passages 78, or both at the inlets 80 and intermediate of the inlets 80 and the outlets 82.

However, without regard to the method of increasing the ratio of wetted boundary to cross sectional area, the first longitudinal shear mixer 44a increases this ratio from that of the first compressive forging passage 72; and by increasing the ratio of wetted boundary to cross sectional area, longitudinal viscous shear mixing of the thermoplastic material is achieved.

In like manner, increasing the cross sectional area of the thermoplastic material by one of the compressive forging passages, 72, 94, or 98, provides mixing of the thermoplastic material by transverse viscous shear.

Alternate mixing by transverse viscous shear and longitudinal viscous shear is highly effective in removing weld lines from thermoplastic materials which have the propensity to form weld lines, and which are either too shear sensitive to use in crossheads with static mixers that excessively divide the molten material, or are too heat sensitive to use in crossheads that include stagnant flow areas.

Preferably, a longitudinal shear mixer, 44a or 44b, increases the ratio of wetted boundary to cross sectional area, from that of the previous compressive forging passage, 72 or 94, by at least 150 percent, whether this increase occurs at the inlets 80 of the longitudinal mixing passages 78, at the outlets 82 or the mixing passages 82, or both at the inlets 80 and intermediate of the inlets 80 and the outlets 82.

Preferably, the minimum total cross sectional area of the longitudinal shear mixer, 44a or 44b, is not more than 40 percent of the preceding compressive forging passage, 72 or 94. If a portion of this reduction of cross sectional area occurs intermediate of the inlets 80 and the outlets 82 of the longitudinal shear mixing passages, 44a or 44b, then, preferably, the total area of the inlets 80 is not more than 80 percent of the cross sectional area of the preceding compressive forging passage, 72 or 94, and the total area of the outlets 82 is not more than 50 percent of the total area of the inlets 80.

In those instances wherein the inlets 80 are equal in cross sectional area to the outlets 82, the area of the longitudinal shear mixer is called the shear-mixing cross sectional area.

In addition to the static mixing of the thermoplastic material that is provided by transverse viscous shear of the compressive forging passages and the longitudinal viscous shear of the longitudinal shear mixers, the present invention provides additional static mixing by diverting the flow of molten thermoplastic material around the mandrel 18b in a first direction by the first helical grooves 86, and by subsequently diverting the flow around the mandrel 18b in the other direction by the second helical grooves 108.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention provides a crosshead for the extrusion of single and multilayer tubing of thermoplastic materials and for eliminating the weld line that tends to occur where opposite branches of the thermoplastic material join distal from the supply passage.

Thus, the present invention is applicable to the extrusion of thermoplastic materials into tubular shapes whenever weld lines in the tubing are detrimental from a strength standpoint or from an appearance standpoint.

More particularly, the present invention is applicable for extruding tubing from thermoplastic materials that have the propensity to form weld lines and that either are too shear sensitive to be used with other types of static mixers, or that are too heat sensitive to be used in static mixers having stagnant flow areas.

What is claimed is:

1. A crosshead for extruding a thermoplastic material along a longitudinal axis, which crosshead comprises:
    supply passage means, being disposed radially outward from said longitudinal axis, for receiving molten thermoplastic material;
    distribution passage means, comprising a first distribution branch that is in fluid communicationn with said supply passage means, for providing a flow of said thermoplastic material that has a first cross sectional area and that is distributed around said longitudinal axis;
    first compressive forging passage means, being disposed around said longitudinal axis, and being in fluid communication with said distribution passage means, for compressively forging said thermoplastic material into a second cross sectional area, and thereby mixing said thermoplastic material by means of transverse viscous shear;
    longitudinal shear mixing means, being disposed around said longitudinal axis, and being in fluid communication with said first compressive forging passage means, for mixing said thermoplastic material by means of longitudinal viscous shear;
    second compressive forging passage means, being disposed around said longitudinal axis, and being in fluid communication with said longitudinal shear mixing means, for compressively forging said thermoplastic material into a third cross sectional area, and thereby mixing said thermoplastic material by means of transverse viscous shear; and
    extrusion opening means, comprising a core that is disposed along said longitudinal axis, comprising a die opening that is annularly disposed around said core and that is in fluid communication with said second compressive forging passage means, and comprising the annular space between said core and said die opening, for extruding said thermoplastic material into a tubular layer of thermoplastic material with a fourth cross sectional area that is substantially equal to said annular space.

2. A crosshead as claimed in claim 1 in which said first compressive forging passage means comprises a first wetted boundary that encompasses said second cross sectional area;
    said first wetted boundary and said second cross sectional area define a first ratio of wetted boundary to cross sectional area;

said longitudinal shear mixing means comprises a shear-mixing cross sectional area, and a second wetted boundary that encompasses said shear-mixing cross sectional area;

said second wetted boundary and said shear-mixing cross sectional area define a second ratio of wetted boundary to cross sectional area; and said longitudinal shear mixing means, and said longitudinal viscous shear mixing thereof, comprises means for increasing said second ratio above said first ratio.

3. A crosshead as claimed in claim 2 in which said increasing of said second ratio of wetted boundary to cross sectional area above said first ratio of wetted boundary to cross sectional ratio comprises increasing said second ratio to at least 250 percent of said first ratio.

4. A crosshead as claimed in claim 2 in which said longitudinal shear mixing means includes an inlet having an inlet area, and an outlet being spaced longitudinally from said inlet and having an outlet area; and said communication of said longitudinal shear mixing means with said first compressive forging passage means comprises said inlet of said longitudinal shear mixing means communicating with said first compressive forging passage means;

said communication of said second compressive forging passage means with said longitudinal shear mixing means comprises said second compressive forging passage means communicating with said outlet of said longitudinal shear mixing means; and said means for increasing said second ratio of wetted boundary to cross sectional area above said first ratio of wetted boundary to cross sectional area comprises increasing said ratio of wetted boundary to cross sectional ratio at said inlet of said longitudinal shear mixing means.

5. A crosshead as claimed in claim 4 in which said means for increasing said second ratio of wetted boundary to cross sectional area above said first ratio of wetted boundary to cross sectional area further comprises increasing the ratio of wetted boundary to cross sectional area between said inlet and said outlet of said longitudinal shear mixing means.

6. A crosshead as claimed in claim 2 in which said increasing of said second ratio of wetted boundary to cross sectional area above said first ratio of wetted boundary to cross sectional ratio comprises means for increasing said second wetted boundary.

7. A crosshead as claimed in claim 6 in which said increasing of said second wetted boundary comprises means for providing a plurality of substantially separate mixing passages each having an inlet that includes an inlet cross sectional area, and each having an outlet that is longitudinally displaced from said inlet thereof and that includes an outlet cross sectional area.

8. A crosshead as claimed in claim 7 in which said increasing of said second ratio of wetted boundary to cross sectional area above said first ratio of wetted boundary to cross sectional area further comprises means for increasing said ratio of wetted boundary to cross sectional area between said inlets and said outlets of said substantially separate mixing passages.

9. A crosshead as claimed in claim 1 in which said longitudinal shear mixing means comprises a shear-mixing cross-sectional area;

said longitudinal shear mixing means, and said longitudinal viscous shear mixing thereof, comprises said shear-mixing cross sectional area being smaller than said second cross sectional area of said first compressive forging passage means.

10. A crosshead as claimed in claim 9 in which said shear-mixing cross sectional area of said longitudinal shear mixing means being smaller than said second cross sectional area of said first compressive forging passage means comprises said shear-mixing cross sectional area being less than 40 percent of said second cross sectional area.

11. A crosshead as claimed in claim 1 in which said longitudinal shear mixing means includes an inlet having an inlet area, and an outlet being longitudinally displaced from said inlet and having an outlet area;

said fluid communication of said longitudinal shear mixing means with said first compressive forging passage means comprises said inlet of said longitudinal shear mixing means communicating with said first compressive forging passage means;

said fluid communication of said second compressive forging passage means with said longitudinal shear mixing means comprises said second compressive forging passage means communicating with said outlet of said longitudinal shear mixing means; and said mixing of said thermoplastic material by means of longitudinal viscous shear comprises said inlet area being smaller than said second cross sectional area of said first compressive forging passage means.

12. A crosshead as claimed in claim 11 in which said inlet area of said longitudinal shear mixing passage means being smaller than said second cross sectional area of said first compressive forging passage means comprises said inlet area being less than 80 percent of said second cross sectional area.

13. A crosshead as claimed in claim 11 in which said mixing of said thermoplastic material by means of longitudinal viscous shear further comprises said outlet area of said longitudinal shear mixing passage means being smaller than said inlet area of said longitudinal shear mixing passage means.

14. A crosshead as claimed in claim 13 in which said outlet area of said longitudinal shear mixing passage means being smaller than said inlet area of said longitudinal shear mixing passage means comprises said outlet area being less than 50 percent of said inlet area.

15. A crosshead as claimed in claim 1 in which said longitudinal shear mixing means includes an inlet having an inlet area, and an outlet being longitudinally displaced from said inlet and having an outlet area;

said fluid communication of said longitudinal shear mixing means with said first compressive forging passage means comprises said inlet of said longitudinal shear mixing means communicating with said first compressive forging passage means;

said fluid communication of said second compressive forging passage means with said longitudinal shear mixing means comprises said second compressive forging passage means communicating with said outlet of said longitudinal shear mixing means; and said mixing of said thermoplastic material by means of longitudinal viscous shear comprises said outlet area of said longitudinal shear mixing means being smaller than said second cross sectional area of said first compressive forging passage means.

16. A crosshead as claimed in claim 15 in which said outlet area of said longitudinal shear mixing passage means being smaller than said second cross sectional area of said first compressive forging passage means comprises said outlet area being less than 40 percent of said second cross sectional area.

17. A crosshead for extruding a thermoplastic material along a longitudinal axis, which crosshead comprises:
supply passage means, being disposed radially outward from said longitudinal axis, for receiving molten thermoplastic material;
distribution passage means, comprising a first distribution branch that is in fluid communication with said supply passage means, for providing a flow of said thermoplastic material that has a first cross sectional area and that is distributed around said longitudinal axis;
first compressive forging passage means, being disposed around said longitudinal axis, and being in fluid communication with said distribution passage means, for compressively forging said thermoplastic material into a second cross sectional area, and thereby mixing said thermoplastic material by means of transverse viscous shear;
longitudinal shear mixing means, comprising a plurality of longitudinally disposed mixing passages being circumferentially spaced around said longitudinal axis, each having an inlet that is in fluid communication with said first compressive forging passage means and that includes an inlet cross sectional area, and each having an outlet that includes an outlet cross sectional area, for mixing said thermoplastic material by means of longitudinal viscous shear;
second compressive forging passage means, being disposed around said longitudinal axis, and being in fluid communication with said outlets of said longitudinally disposed mixing passages, for compressively forging said thermoplastic material into a third cross sectional area, and thereby mixing said thermoplastic material by transverse viscous shear; and
extrusion opening means, comprising a core that is disposed along said longitudinal axis, comprising a die opening that is annularly disposed around said core and that is in fluid communication with said second compressive forging passage means, and comprising the annular space between said core and said die opening, for extruding said thermoplastic material into a tubular layer of thermoplastic material with a fourth cross sectional area that is substantially equal to said annular space.

18. A crosshead as claimed in claim 17 in which said inlet cross sectional areas of said longitudinal shear mixing means provide a total inlet area; and
said longitudinal mixing means, and said longitudinal viscous mixing thereof, comprises said total inlet area being smaller than said second cross sectional area of said first compressive forging means.

19. A crosshead as claimed in claim 18 in which said total inlet area of said longitudinal mixing means being smaller than said second cross sectional area of said first compressive forging passage means comprises said total inlet area being less than 80 percent of said second cross sectional area.

20. A crosshead as claimed in claim 18 in which said outlet cross sectional areas of said longitudinal shear mixing means provide a total outlet area; and
said longitudinal mixing means, and said longitudinal shear mixing thereof, further comprises said total outlet area being smaller than said total inlet area.

21. A crosshead as claimed in claim 20 in which said total outlet area of said longitudinal shear mixing means being smaller than said total inlet area comprises said total outlet area being less than 50 percent of said total inlet area.

22. A crosshead as claimed in claim 17 in which said outlet cross sectional areas of said longitudinal shear mixing means provide a total outlet area; and
said longitudinal mixing means, and said longitudinal shear mixing thereof, comprises said total outlet area being smaller than said second cross sectional area of said first compressive forging means.

23. A crosshead as claimed in claim 22 in which said total outlet area of said longitudinal mixing means being smaller than said second cross sectional area of said first compressive forging passage means comprises said total outlet area being less than 40 percent of said second cross sectional area.

24. A crosshead for extruding a thermoplastic material along a longitudinal axis, which crosshead comprises:
supply passage means, being disposed radially outward from said longitudinal axis, for receiving molten thermoplastic material;
distribution passage means, comprising a first distribution branch that is in fluid communication with said supply passage means, for providing a flow of said thermoplastic material that has a first cross sectional area and that is distributed around said longitudinal axis;
first compressive forging passage means, being disposed around said longitudinal axis, and being in fluid communication with said distribution passage means, for compressively forging said thermoplastic material into a second cross sectional area, and thereby mixing said thermoplastic material by means of transverse viscous shear;
longitudinal shear mixing means, comprising a plurality of helically shaped mixing passages being circumferentially spaced around said longitudinal axis, each having an inlet that is in fluid communication with said first compressive forging passage means and that includes an inlet cross sectional area, and each having an outlet that includes an outlet cross sectional area, for mixing said thermoplastic material by means of longitudinal viscous shear;
second compressive forging passage means, being disposed around said longitudinal axis, and being in fluid communication with said outlets of said helically shaped mixing passages, for compressively forging said thermoplastic material into a third cross sectional area, and thereby mixing said thermoplastic material by means of transverse viscous shear; and
extrusion opening means, comprising a core that is disposed along said longitudinal axis, comprising a die opening that is annularly disposed around said core and that is in fluid communication with said second compressive forging passage means, and comprising the annular space between said core and said die opening, for extruding said thermoplastic material into a tubular layer of thermoplastic material with a fourth cross sectional area that is substantially equal to said annular space.

25. A crosshead as claimed in claim 24 in which said inlet cross sectional areas of said longitudinal shear mixing means provide a total inlet area; and said longitudinal mixing means, and said longitudinal viscous mixing thereof, comprises said total inlet area being smaller than said second cross sectional area of said first compressive forging means.

26. A crosshead as claimed in claim 25 in which said total inlet area of said longitudinal mixing means being smaller than said second cross sectional area of said first compressive forging passage means comprises said total inlet area being less than 80 percent of said second cross sectional area.

27. A crosshead as claimed in claim 25 in which said outlet cross sectional areas of said longitudinal shear mixing means provide a total outlet area; and said longitudinal mixing means, and said longitudinal shear mixing thereof, further comprises said total outlet area being smaller than said total inlet area.

28. A crosshead as claimed in claim 27 in which said total outlet area of said longitudinal shear mixing means being less than said total inlet area of said longitudinal shear mixing means comprises said total outlet area being less than 50 percent of said total inlet area.

29. A crosshead as claimed in claim 24 in which said outlet cross sectional areas of said longitudinal shear mixing means provide a total outlet area; and said longitudinal mixing means, and said longitudinal shear mixing thereof, comprises said total outlet area being smaller than said second cross sectional area of said first compressive forging means.

30. A crosshead as claimed in claim 29 in which said total outlet area of said longitudinal mixing means being smaller than said second cross sectional area of said first compressive forging passage means comprises said total outlet area being less than 40 percent of said second cross sectional area.

31. A crosshead for extruding a thermoplastic material along a longitudinal axis, which crosshead comprises:

supply passage means, being disposed radially outward from said longitudinal axis, for receiving molten thermoplastic material;

distribution passage means, comprising a first distribution branch that is in fluid communication with said supply passage means, for providing a flow of said thermoplastic material that has a first cross sectional area and that is distributed around said longitudinal axis;

first compressive forging passage means, being disposed around said longitudinal axis, and being in fluid communication with said distribution passage means, for compressively forging said thermoplastic material into a second cross sectional area, and thereby mixing said thermoplastic material by means of transverse viscous shear;

longitudinal shear mixing means, comprising a first plurality of helically shaped mixing passages that are circumferentially spaced around said longitudinal axis, that rotate about said longitudinal axis in a first direction, that each have a first inlet in fluid communication with said first compressive forging passage means, and that each have a first outlet, and comprising a second plurality of helically shaped mixing passages that are circumferentially spaced around said longitudinal axis, that rotate about said longitudinal axis in a second direction, that each have a second inlet in fluid communication with a respective one of said first outlets, and that each have a second outlet, for mixing said thermoplastic material by means of longitudinal viscous shear;

second compressive forging passage means, being disposed around said longitudinal axis, and being in fluid communication with said second outlets of said second plurality of helically shaped mixing passages, for compressively forging said thermoplastic material into a third cross sectional area, and thereby mixing said thermoplastic material by means of transverse viscous shear; and extrusion opening means, comprising a core that is disposed along said longitudinal axis, comprising a die opening that is annularly disposed around said core and that is in fluid communication with said second compressive forging passage means, and comprising the annular space between said core and said die opening, for extruding said thermoplastic material into a tubular layer of thermoplastic material with a fourth cross sectional area that is substantially equal to said annular space.

32. A crosshead as claimed in claim 31 in which said first inlets of said first plurality of helically shaped mixing passages provide a first total inlet area;

said second inlets of said second plurality of helically shaped mixing passages provide a second total inlet area; and said longitudinal mixing means, and said longitudinal viscous mixing thereof, comprises one of said total inlet areas being smaller than said second cross sectional area of said first compressive forging means.

33. A crosshead as claimed in claim 32 in which said first outlets of said first plurality of helically shaped mixing passages provide a first total outlet area;

said second outlets of said second plurality of helically shaped mixing passages provide a second total outlet area; and said longitudinal mixing means, and said longitudinal viscous mixing thereof, further comprises one of said total outlet areas being smaller than said one total inlet area.

34. A crosshead as claimed in claim 31 in which said first outlets of said first plurality of helically shaped mixing passages provide a first total outlet area;

said second outlets of said second plurality of helically shaped mixing passages provide a second total outlet area; and said longitudinal mixing means, and said longitudinal viscous mixing thereof, comprises one of said total outlet areas being smaller than said second cross sectional area of said first compressive forging passage means.

35. A crosshead as claimed in claim 31 in which said crosshead further comprises third compressive forging passage means, beng interposed intermediate of said first plurality and said second plurality of helically shaped mixing passages, for forging said thermoplastic material into a fifth cross sectional area; and said communication of said inlets of said second plurality helically shaped mixing passages with said outlets of said first plurality of helically shaped mixing passages comprises said third compressive forging passage means communicating with said first outlets, and said second inlets communicating with said third compressive forging passage means.

36. A crosshead as claimed in claim 35 in which said first and second inlets of said first and second helically shaped mixing passages provide first and second total inlet areas, respectively;

said first and second outlets of said first and second plurality of helically shaped mixing passages provide first and second total outlet areas, respectively; and each of said cross sectional areas of respective ones of said compressive forging passage means is larger than any one of said total areas of said first and second pluralities of helically shaped mixing passages.

37. A crosshead as claimed in claim 36 in which said total outlet areas of said pluralities of helically shaped mixing passages are smaller than respective ones of said total inlet areas of said pluralities of helically shaped mixing passages.

38. A crosshead for extruding a thermoplastic material along a longitudinal axis, which crosshead comprises:

supply passage means, being disposed radially outward from said longitudinal axis, for receiving molten thermoplastic material;

distribution passage means, comprising a first distribution branch that is in fluid communication with said supply passage means, for providing a flow of said thermoplastic material that has a first cross sectional area and that is distributed around said longitudinal axis;

a mixing passage, having an inlet that is disposed around said longitudinal axis and that is in fluid communication with said distribution passage means, having an outlet that is disposed around said longitudinal axis and that is displaced longitudinally from said inlet, having first diverting means for diverting said flow of thermoplastic material around said longitudinal axis in one direction, and having second diverting means for receiving said diverted thermoplastic material and for diverting said flow of thermoplastic material around said longitudinal axis in the other direction; and extrusion opening means, being in fluid communication with said outlet of said mixing passage, comprising a core that is disposed along said longitudinal axis, comprising a die opening that is annularly disposed around said core and that is in fluid communication with said outlet of said mixing passage, and comprising the annular space between said core and said die opening, for extruding said thermoplastic material into a tubular layer of thermoplastic material with a cross sectional area that is substantially equal to said annular space.

39. A crosshead as claimed in claim 38 in which said crosshead includes compressive forging passage means, being interposed intermediate of said distribution passage means and said mixing passage, for mixing said thermoplastic material by means of transverse viscous shear; and said communication of said inlet of said mixing passage with said distribution passage means comprises said compressive forging passage means being in fluid communication with said distribution passage means and said inlet of said mixing passage being in fluid communication with said compressive forging passage.

40. A crosshead as claimed in claim 39 in which said crosshead includes compressive forging passage means, being interposed between said first diverting means and said second diverting means, for mixing said thermoplastic material by means of transverse viscous shear.

41. A crosshead as claimed in claim 39 in which said crosshead includes compressive forging passage being interposed intermediate of said mixing passage means and said extrusion opening means, for mixing said thermoplastic material by means of transverse viscous shear; and said fluid communication of said die opening with said outlet of said mixing passage comprises said compressive forging passage means being in fluid communication with said outlet of said mixing passage and said die opening being in fluid communication with said compressive forging passage means.

42. A crosshead as claimed in claim 38 in which said first diverting means comprises a first plurality of helically shaped mixing passages that are circumferentially spaced around said longitudinal axis, that rotate about said longitudinal axis in a first direction; and said second diverting means comprises a second plurality of helically shaped mixing passages that are circumferentially spaced around said longitudinal axis, that rotate about said longitudinal axis in a second direction.

43. A crosshead as claimed in claim 42 in which said crosshead includes compressive forging means, being interposed intermediate of said distribution passage means and said mixing passage, for mixing said thermoplastic material by means of transverse viscous shear; and said communication of said inlet of said mixing passage with said distribution passage means comprises said compressive forging passage means being in fluid communication with said distribution passage means and said inlet of said mixing passage being in fluid communication with said compressive forging passage.

44. A crosshead as claimed in claim 42 in which said crosshead includes compressive forging means, being interposed intermediate of said first diverting means and said second diverting means, for mixing said thermoplastic material by means of transverse viscous shear.

45. A crosshead as claimed in claim 42 in which said crosshead includes compressive forging means, being interposed intermediate of said mixing passage and said extrusion opening means, for mixing said thermoplastic material by means of transverse viscous shear; and said fluid communication of said die opening with said outlet of said mixing passage comprises said compressive forging passage means being in fluid communication with said outlet of said mixing passage and said die opening being in fluid communication with said compressive forging passage means.

46. A method for mixing a thermoplastic material in a crosshead of the type having distribution passage means for providing a flow of thermoplastic material that is disposed around a longitudinal axis and that has a first cross sectional area, and having an extrusion opening that comprises the annular space between a core and a die opening, which method for mixing comprises:

(a) receiving said flow of thermoplastic material from said distribution passage means;

(b) compressively forging said flow of thermoplastic material into a second cross sectional area that is larger than said first cross sectional area, and thereby mixing said thermoplastic material by transverse viscous shear;
(c) longitudinally shearing said compressively forged thermoplastic material by increasing the ratio of wetted boundary to cross sectional area from the ratio of wetted boundary to cross sectional area of the compressive forging step; and
(d) compressively forging said longitudinally sheared thermoplastic material from the cross sectional area of the longitudinal shearing step to a larger cross sectional area, prior to supplying said thermoplastic material to said extrusion opening.

47. A method as claimed in claim 46 in which said increasing of said ratio of wetted boundary to cross sectional area comprises increasing said wetted boundary in said longitudinal shearing step.

48. A method as claimed in claim 47 in which said increasing of said wetted boundary in said longitudinal shearing step comprises dividing said compressively forged thermoplastic material into a plurality of substantially separate flows of thermoplastic material in said longitudinal shearing step.

49. A method as claimed in claim 46 in which said increasing of said ratio of wetted boundary to cross sectional area comprises decreasing said cross sectional area of said flow of thermoplastic material in said longitudinal shearing step.

* * * * *